(12) United States Patent
Tumula et al.

(10) Patent No.: US 7,635,953 B2
(45) Date of Patent: Dec. 22, 2009

(54) INSULATION DETECTION POWER SUPPLY AND ELECTRONIC BALLAST

(75) Inventors: Naveen K. Tumula, Mount Prosepct, IL (US); Joseph C. Jansen, Chicago, IL (US); Rama Venkat, Aurora, IL (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 336 days.

(21) Appl. No.: 11/840,281

(22) Filed: Aug. 17, 2007

(65) Prior Publication Data

US 2008/0042579 A1 Feb. 21, 2008

Related U.S. Application Data

(60) Provisional application No. 60/822,658, filed on Aug. 17, 2006.

(51) Int. Cl.
*H05B 37/02* (2006.01)
(52) U.S. Cl. .......................... 315/94; 315/105; 315/119
(58) Field of Classification Search .................. 315/32, 315/94, 105, 106, 101, 98, 97, 209 R, 276, 315/119, 125
See application file for complete search history.

(56) References Cited

U.S. PATENT DOCUMENTS

| 4,740,861 | A | 4/1988 | Droho et al. |
| 5,646,484 | A * | 7/1997 | Sharma et al. ................. 315/74 |
| 6,489,729 | B1 | 12/2002 | Erhardt et al. |
| 6,838,834 | B2 | 1/2005 | Okawa |
| 7,378,806 | B2 * | 5/2008 | Nerone ........................ 315/291 |
| 2004/0263091 | A1 | 12/2004 | Deurloo et al. |

FOREIGN PATENT DOCUMENTS

WO 03056537 A1 7/2003

* cited by examiner

*Primary Examiner*—David Hung Vu (57) ABSTRACT

A power supply for an insulation detector having a heating element and a temperature sensitive switch thermally coupled to the heating element, the power supply including a power circuit 120 operable to provide heating element power 102 to the heating element 32; a short protector 108 operably connected to the power circuit 120 to monitor current flow through the heating element 32; and an insulation detector sensor 110 operably connected to the power circuit 120 to monitor presence of the heating element 32.

39 Claims, 6 Drawing Sheets

INSULATION DETECTION POWER SUPPLY AND ELECTRONIC BALLAST

CROSS REFERENCE TO RELATED APPLICATION

This application claims the benefit of U.S. provisional application Ser. No. 60/822,658, filed Aug. 17, 2006, the entire subject matter of which is hereby incorporated by reference.

This invention relates generally to electronic ballasts for lighting fixtures, and more specifically to an insulation detector power supply.

Certain lighting systems using electronic ballasts employ insulation detectors to ensure that the lighting system is not covered by a thermal insulation. The insulation detector protects the lighting system from overheating if thermal insulation is inadvertently installed by cutting off power to the lighting system. The insulation detector typically includes a heating element thermally coupled to a temperature sensitive switch. The heating element is a resistive element and receives power from an insulation detector power supply. If the heating element is unable to dissipate the heat it generates, the temperature of the insulation detector increases until the temperature at the temperature sensitive switch exceeds a setpoint and the temperature sensitive switch opens. The temperature sensitive switch is typically wired in series with the mains power to the lighting system, so the mains power to the lighting system is shut off when the temperature sensitive switch opens.

Unfortunately, the insulation detector power supply is powered by the mains power to the lighting system. The voltage of the mains power can fluctuate, causing the voltage output of the insulation detector power supply to vary. The power generated within the heating element of the insulation detector is proportional to the square of the voltage across the heating element, so even a small voltage fluctuation makes a substantial change in the heat generation within the heating element. If the heating element generates less power than the design value, more insulation can be applied to the lighting system before the insulation detector shuts off the mains power, so that the lighting system may exceed the desired operating temperature.

Another problem is the detection of problems with the insulation detector, such as a missing or shorted insulation detector. If the lighting system operates normally with a missing or shorted insulation detector, the user can incorrectly conclude that the lighting system installation is correct, even though a thermal insulation problem exists and the lighting system may be overheating. A shorted insulation detector may also cause overheating in the insulation detector power supply.

Yet another problem with the insulation detector is miswiring or loose connections between the insulation detector and the electronic ballast. The insulation detector is powered from the insulation detector power supply, so miswiring or loose connections can result in shorts or overheating in the lighting system.

It would be desirable to provide an insulation detector power supply that overcomes the above disadvantages.

One aspect of the invention provides a power supply for an insulation detector having a heating element and a temperature sensitive switch thermally coupled to the heating element, the power supply including a power circuit operable to provide heating element power to the heating element; a short protector operably connected to the power circuit to monitor current flow through the heating element; and an insulation detector sensor operably connected to the power circuit to monitor presence of the heating element.

Another aspect of the invention provides a power supply system for an insulation detector having a heating element and a temperature sensitive switch thermally coupled to the heating element, the power supply system including means for providing heating element power to the heating element; means for protecting the power providing means from shorts operably connected to the power providing means; and means for detecting insulation detector presence operably connected to the power providing means.

Another aspect of the invention provides an electronic ballast for an insulation detector having a heating element and a temperature sensitive switch thermally coupled to the heating element, the electronic ballast including an electronic ballast power supply; a power circuit receiving supply power from the electronic ballast power supply and operable to provide heating element power to the heating element; and a short protector operably connected to the power circuit to monitor current flow through the heating element; and an insulation detector sensor operably connected to the power circuit to monitor presence of the heating element.

Another aspect of the invention provides an electronic ballast with an insulation detector having a heating element and a temperature sensitive switch thermally coupled to the heating element, the electronic ballast including an electronic ballast power supply having boost transformer, the boost transformer having a primary winding and a secondary winding; and a voltage multiplier circuit including the secondary winding and being operable to provide heating element power to the heating element.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

Figure 1:
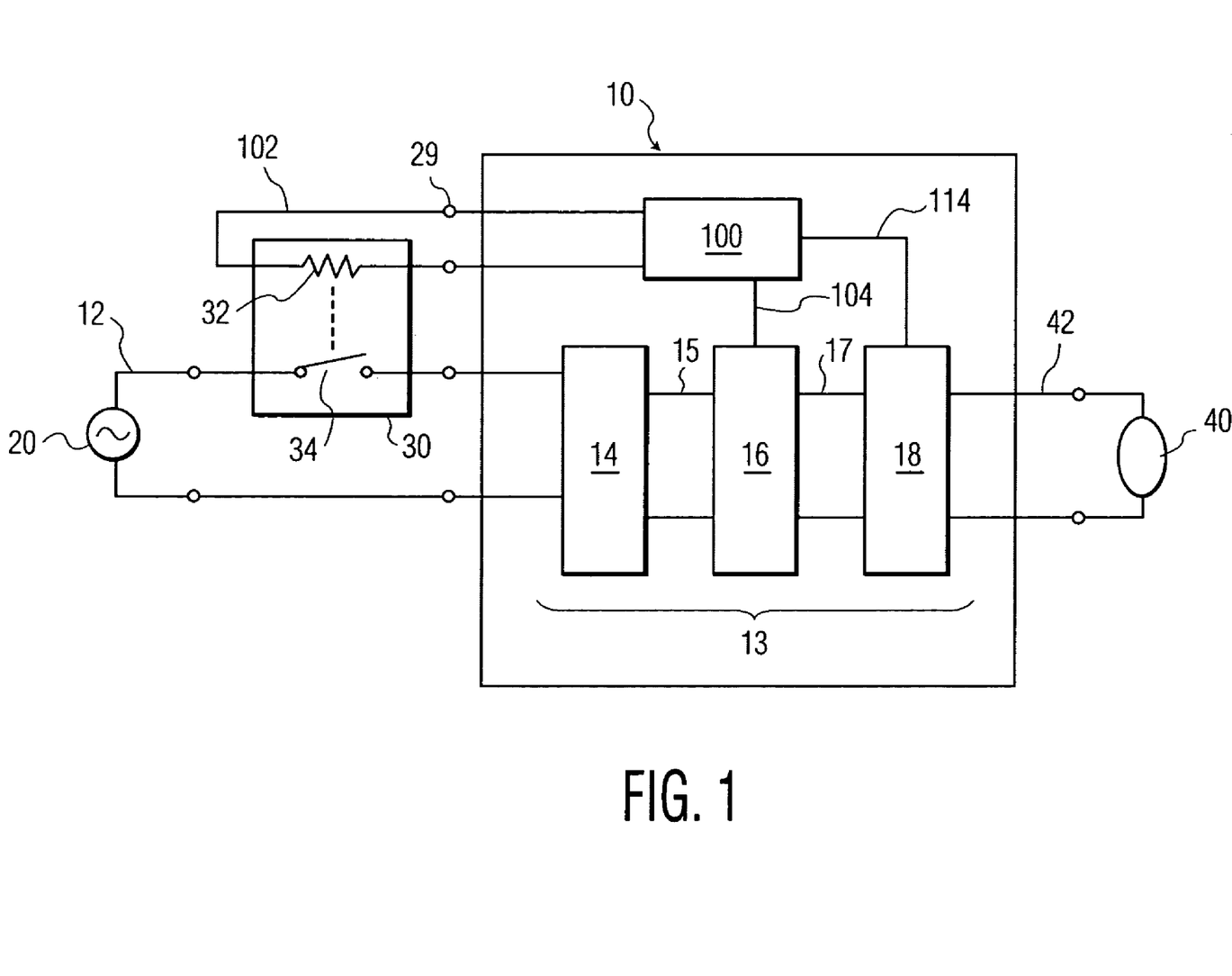
FIG. 1 is a block diagram of a lighting system with an electronic ballast having an insulation detector power supply made in accordance with the present invention.

FIG. 1 is a block diagram of a lighting system with an electronic ballast having an insulation detector power supply made in accordance with the present invention. The insulation detector power supply provides the desired voltage to the insulation detector regardless of the mains voltage to the electronic ballast. The insulation detector power supply can include protective circuits, such as insulation detector sensing, insulation detector isolation, short protection, and/or voltage range detection.

Electronic ballast 10 receives mains power 12 from mains power supply 20 through insulation detector 30 and provides lamp power 42 for a lamp 40, such as an HID lamp. The insulation detector 30 includes a heating element 32 thermally coupled to a temperature sensitive switch 34. The heating element 32 receives heating element power 102 from insulation detector power supply 100 at supply outlet 29. When the temperature sensitive switch 34 exceeds a predetermined temperature due to heating of the heating element 32, the temperature sensitive switch 34 opens and cuts off the mains power 12 to the electronic ballast 10. The insulation detector power supply 100 receives supply power 104 from the electronic ballast 10.

The exemplary electronic ballast 10 includes an electronic ballast power supply 13 including a full wave bridge rectifier 14, a boost converter/power factor controller (PFC) 16, a step-down converter/inverter 18, and the insulation detector power supply 100. The full wave bridge rectifier 14 rectifies the mains power 12 to a rectified power 15, which is provided to the boost converter/PFC 16. The mains power 12 is typically in the range of about 120 to 277 VAC, but can be another voltage or direct current as desired for a particular application. The boost converter/PFC 16 provides DC bus power 17 to the step-down converter/inverter 18, which provides lamp power 42 to the lamp 40. Those skilled in the art will appreciate that the configuration and the components of the electronic ballast 10 can vary, depending on factors such as the magnitude and nature (AC or DC) of the mains power 12. The components of the electronic ballast 10 can also vary to produce the desired lamp power 42. The electronic ballast power supply 13 can be any power supply capable of converting the mains power 12 to the lamp power 42.

The supply power 104 can be tapped from the electronic ballast 10 at any location desired. Examples of tapping power from electronic ballasts are provided in U.S. Patent Application Pub. No. 20040263091 to Deurloo, et al, entitled Electronic Ballast with Low Voltage Output, incorporated herein by reference. In one embodiment, the supply power 104 is power in or out of the components of the electronic ballast 10, such as mains power 12, rectified power 15, or DC bus power 17, which have exemplary values of 120 to 277 VAC, 120 to 277 VDC, and 460 to 500 VDC, respectively. In another embodiment, the supply power 104 is power from one of the components of the electronic ballast 10, such as an existing transformer or inductor used for another purpose in the circuit. In one example, the supply power 104 is from an auxiliary winding on a boost inductor, a buck inductor, a zero current detect section of a boost inductor, or a zero current detect section of a buck inductor.

Figure 2:
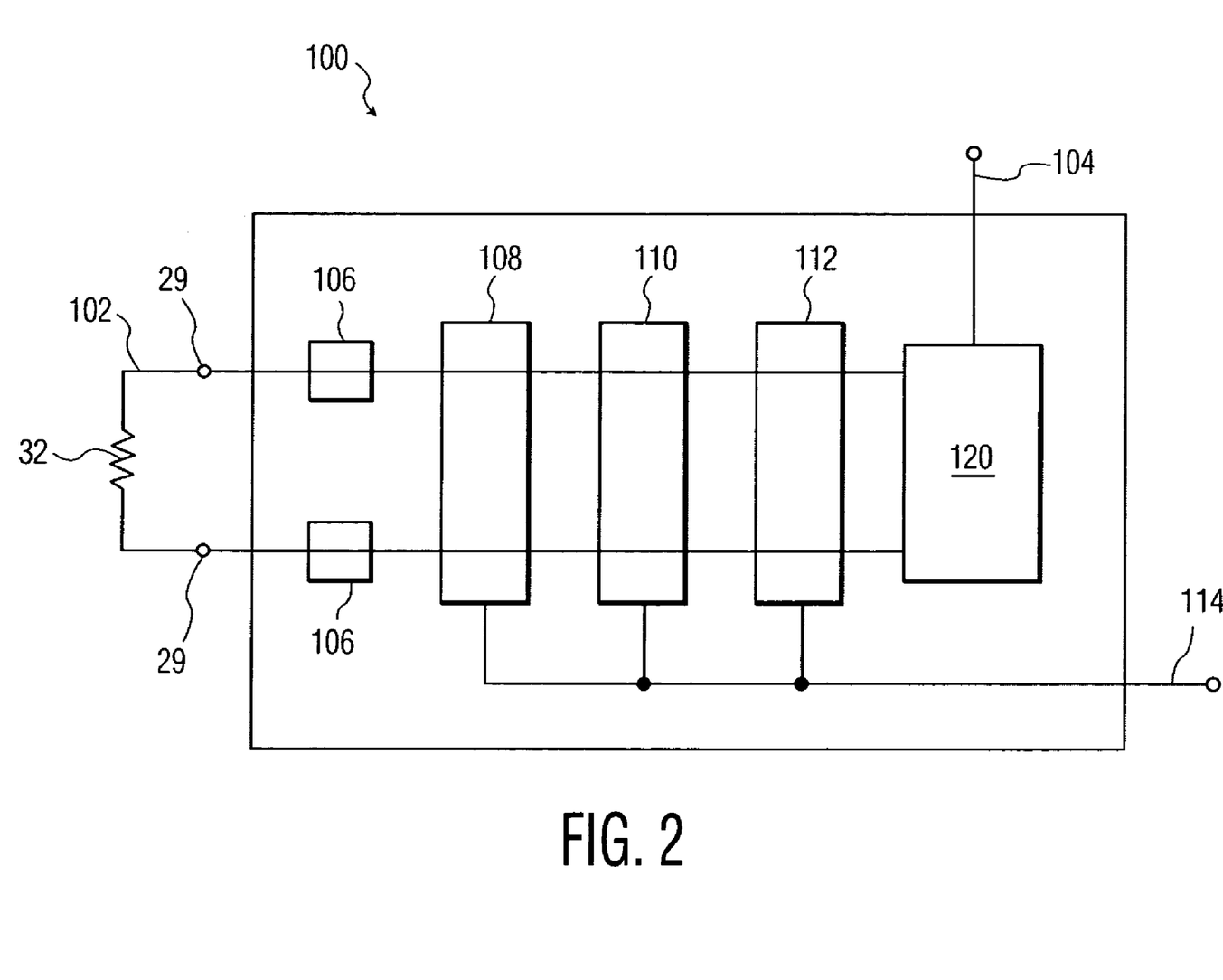
FIG. 2 is a block diagram of an insulation detector power supply made in accordance with the present invention.

FIG. 2, in which like elements share like reference numbers with FIG. 1, is a block diagram of an insulation detector power supply made in accordance with the present invention. The insulation detector power supply 100 receives supply power 104 from the electronic ballast 10 at a power circuit 120 and provides the heating element power 102 to the heating element 32. The insulation detector power supply 100 can include one or more protective circuits operably connected to the power circuit 120, such as insulation detector isolation 106 to isolate the insulation detector power supply 100 from the rest of the electronic ballast 10, short protector 108 to protect the insulation detector power supply 100 should the output be shorted, insulation detector sensor 110 to detect the presence of the insulation detector 30, and voltage range detector 112 to detect when the current of the heating element power 102 is outside a predetermined range. One or more of the protective circuits can generate a lamp standby signal 114 to shut down lamp power 42 to the lamp 40 when an off-normal condition is detected. Those skilled in the art will appreciate that the protective circuits can overlap, with one circuit providing more than one protective function. For example, the voltage range detector 112 can protect against a missing insulation detector, a short across the insulation detector power supply 100, and/or miswiring of the insulation detector power supply 100. Any of these problems can cause the current of the heating element power 102 to be outside the predetermined range, so that the voltage range detector 112 senses an off-normal condition. One or more of the insulation detector isolation 106, short protector 108, insulation detector sensor 110, and/or voltage range detector 112 can be omitted as desired for a particular application.

The power circuit 120 can be any power circuit capable of converting the supply power 104 from the electronic ballast 10 to the voltage desired for the heating element power 102. In one embodiment, the supply power 104 is in the range of 90 to 500 volts AC or DC and the voltage of the heating element power 102 is 120 VDC. In one embodiment, the power circuit 120 is a voltage multiplier circuit. When the supply power 104 is from an auxiliary winding on a boost inductor, a buck inductor, a zero current detect section of a boost inductor, or a zero current detect section of a buck inductor, the auxiliary winding can be part of the power circuit 120. For example, when the supply power 104 is from a secondary winding on a boost transformer in the boost converter/PFC, the secondary winding can be used as part of a voltage multiplier circuit such as a voltage doubler circuit, a voltage tripler circuit, a voltage quadra puller, a voltage pent puller, or the like, to generate the desired heating element power 102. In another embodiment, the power circuit 120 is a switched mode power supply (SMPS). The power circuit 120 can be a switched mode power supply such as a buck converter, boost converter, buck-boost converter, flyback converter, forward converter, Ćuk converter, SEPIC converter, or the like, as suited for the particular application.

Figure 3:
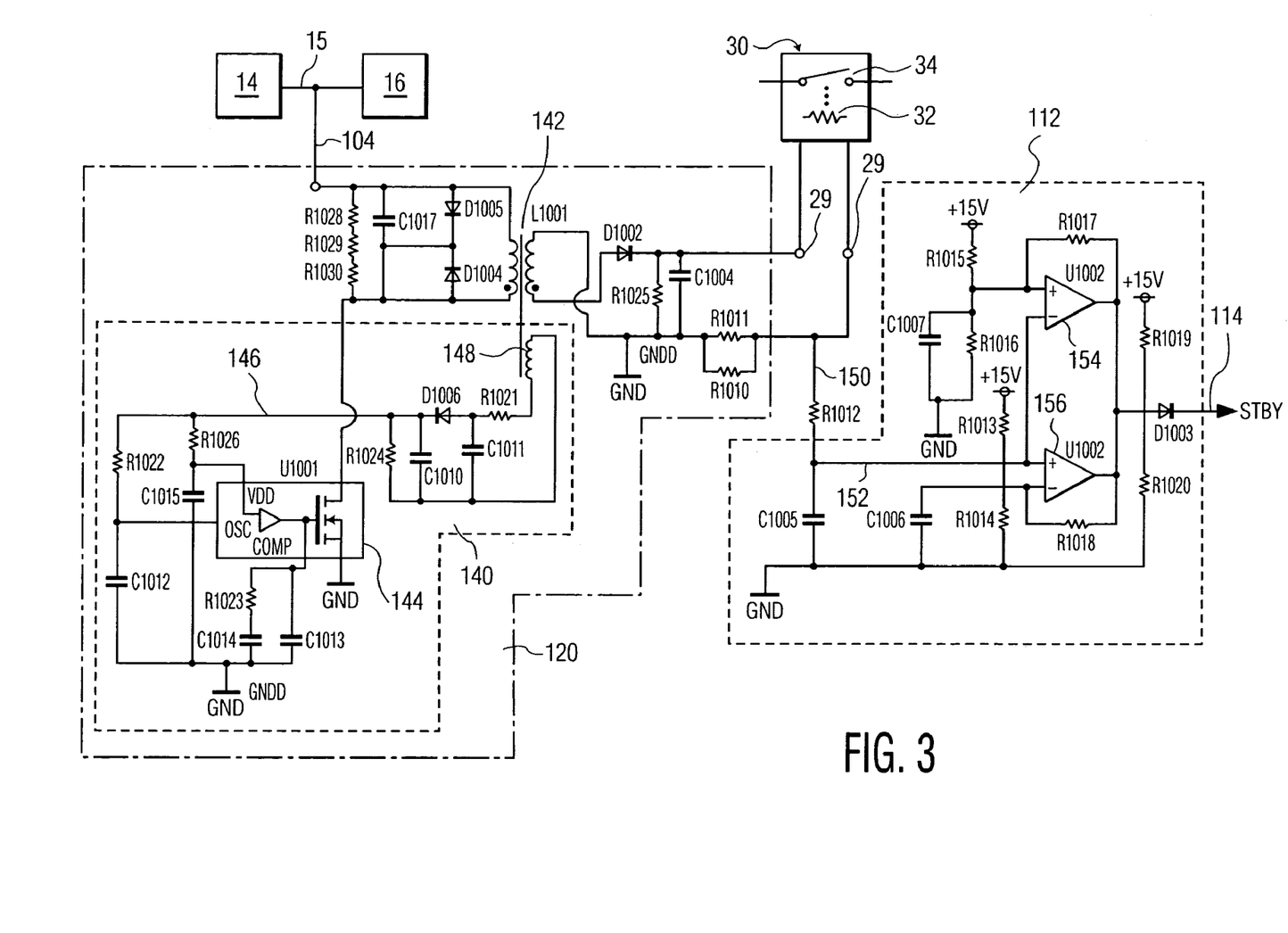
FIG. 3 is a schematic diagram of another insulation detector power supply made in accordance with the present invention.

FIG. 3, in which like elements share like reference numbers with FIGS. 1 and 2, is a schematic diagram of another insulation detector power supply made in accordance with the present invention. In this example, the switched mode power supply of the insulation detector power supply is a flyback converter with pulse width modulation that acts as a short protector and an insulation detector sensor. The insulation detector power supply also includes a voltage range detector that acts as an additional short protector, an additional insulation detector sensor, and a miswiring detector.

The insulation detector power supply 100 includes the power circuit 120 having a pulse width modulator (PWM) circuit 140 and a voltage range detector 112. The insulation detector power supply 100 receives supply power 104 from rectified power 15. In one embodiment, the rectified power 15 is about 120 to 277 VDC. The heating element 32 of the insulation detector 30 is connected to the supply output 29 of the insulation detector power supply 100. The voltage range detector 112 generates a lamp standby signal 114 to shut down lamp power to the lamp when an off-normal condition is detected.

In operation, the power circuit 120 receives the supply power 104 at transformer 142. Pulse width modulator (PWM) 144 connected between the transformer 142 and ground modulates the supply power 104 in response to a heater voltage feedback signal 146 sensed from auxiliary winding 148 of the transformer 142. The transformer 142 powers the heating element 32. The voltage range detector 112 monitors heating element current 150 through the heating element 32 as heating element voltage signal 152, which is provided to comparators 154, 156. The comparators 154, 156 monitor the heating element voltage signal 152 to assure that the heating element current 150 is within the desired range. The comparator 154 compares the heating element voltage signal 152 to a lower reference voltage generated by one voltage divider, and the comparator 156 compares the heating element voltage signal 152 to a upper reference voltage generated by another voltage divider. When the heating element voltage signal 152 falls below the lower reference voltage, the comparator 154 generates the lamp standby signal 114. When the heating element voltage signal 152 exceeds the upper reference voltage, the comparator 156 generates the lamp standby signal 114. The lamp standby signal 114 can be provided to any place in the electronic ballast that is able to shut down the lamp power to the lamp. In one example, the lamp standby signal 114 is provided to the microprocessor in the step-down converter/inverter and the microprocessor shuts down the step-down converter/inverter providing lamp power to the lamp.

The PWM circuit 140 and voltage range detector 112 act as protective circuits for the insulation detector power supply 100. The PWM circuit 140 acts as a short protector and an insulation detector sensor. When the supply output 29 is shorted, the auxiliary winding 148 does not detect any voltage across the heating element 32, the heater voltage feedback signal 146 goes to zero, and the PWM 144 shuts down the supply power 104 through the transformer 142. When the supply output 29 is open, such as when no insulation detector is installed, the PWM circuit 140 will detect that there is no current flow through the transformer 142, the heater voltage feedback signal 146 goes to zero, and the PWM 144 shuts down the supply power 104 through the transformer 142.

The voltage range detector 112 acts as an additional short protector, an additional insulation detector sensor, and a miswiring detector. When the supply output 29 is shorted, the voltage range detector 112 will detect that the heating element current 150 is too high as indicated by the heating element voltage signal 152. When the supply output 29 is open, such as when no insulation detector is installed, the voltage range detector 112 will detect that the heating element current 150 is too low as indicated by the heating element voltage signal 152. Miswiring can cause a short, an open, or a partial short or partial open. When the voltage range detector 112 detects the heating element current 150 as indicated by the heating element voltage signal 152 as being outside the desired range, the voltage range detector 112 generates the lamp standby signal 114 to shut down the lamp power to the lamp.

Figure 4A:
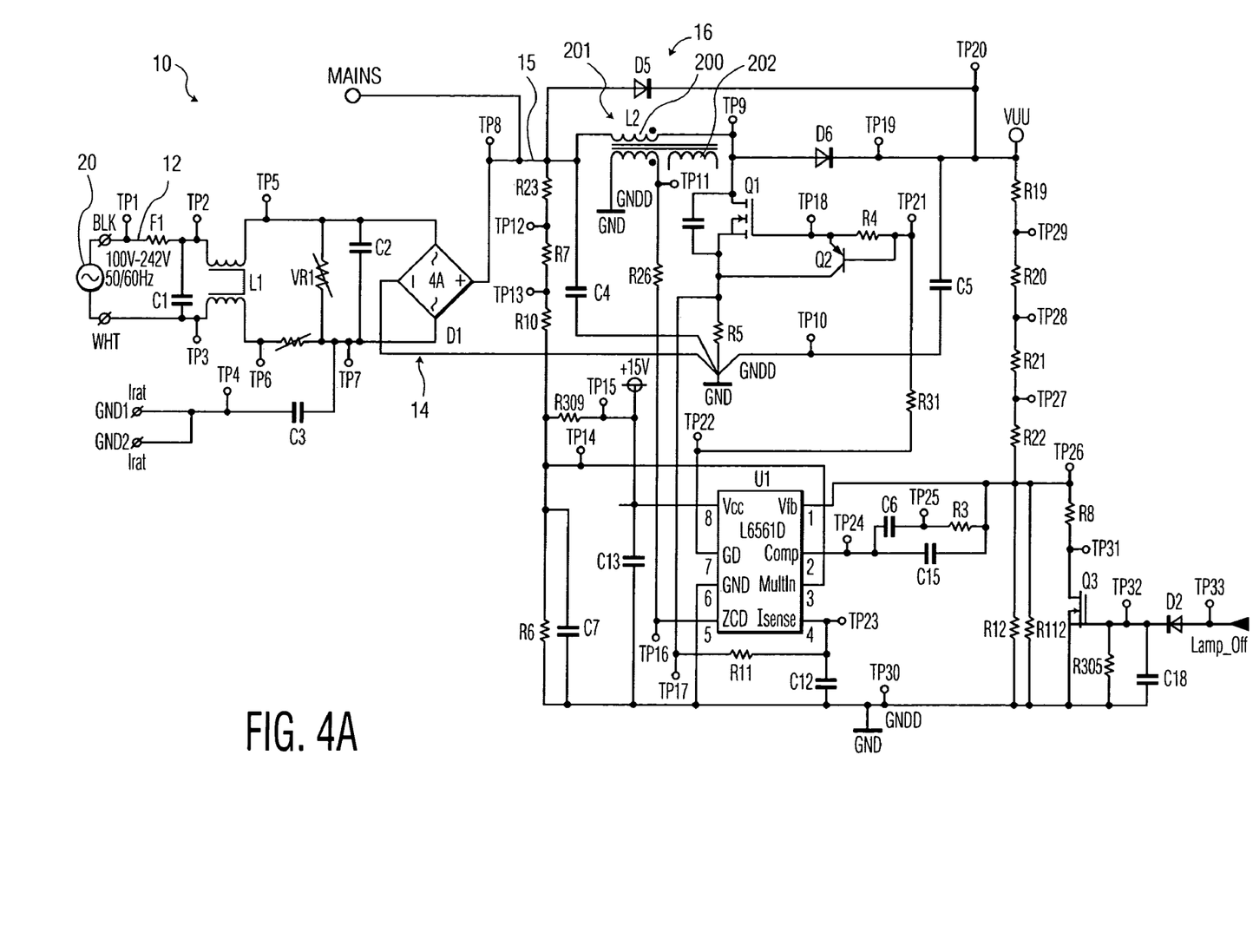
FIGS. 4A-4B are schematic diagrams of a portion of an electronic ballast and an insulation detector power supply, respectively, made in accordance with the present invention.
Figure 4B:
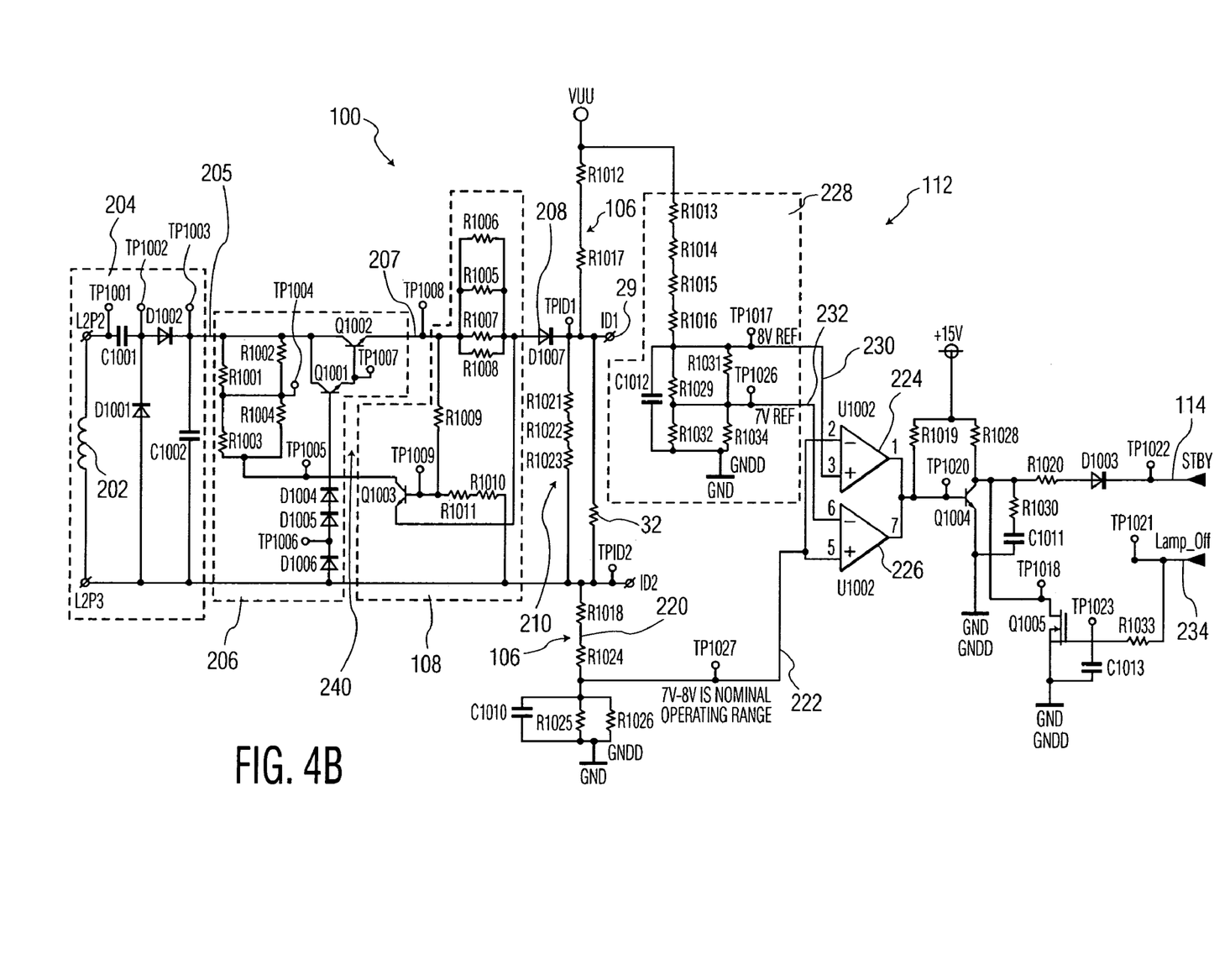
Figure 5A:
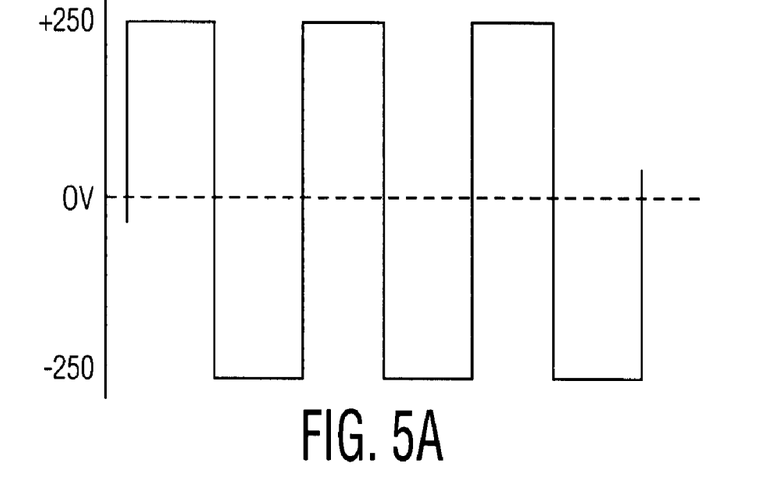
FIGS. 5A-5C are waveform diagrams for the electronic ballast and insulation detector power supply of FIGS. 4A-4B.
Figure 5B:
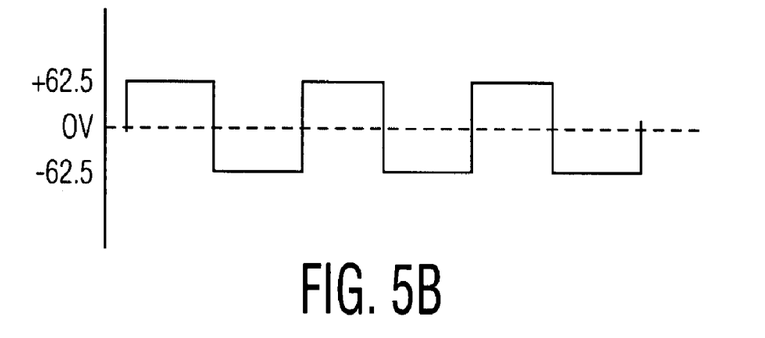
Figure 5C:
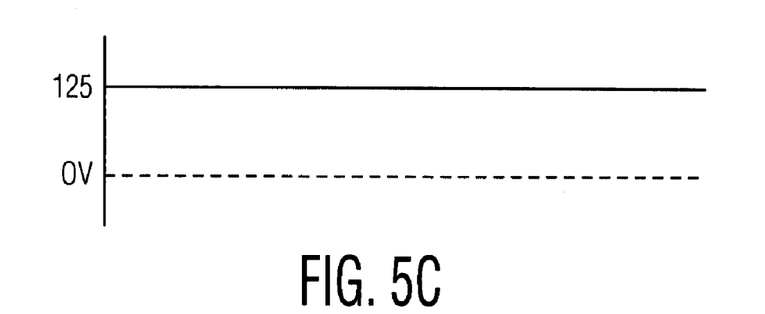

FIGS. 4A-4B, in which like elements share like reference numbers with each other and with FIGS. 1 and 2, are schematic diagrams of a portion of an electronic ballast and an insulation detector power supply, respectively, made in accordance with the present invention. FIGS. 5A-5C are waveform diagrams for the electronic ballast and insulation detector power supply of FIGS. 4A-4B. In this example, the switched mode power supply of the insulation detector power supply is a voltage doubler circuit. The insulation detector power supply also includes a short protector, insulation detector isolation, and a voltage range detector.

Referring to FIG. 4A, the portion of the electronic ballast 10 illustrated includes mains power supply 20 providing mains power 12 to a full wave bridge rectifier 14. The full wave bridge rectifier 14 provides rectified power 15 to a boost converter/power factor controller (PFC) 16, which includes a boost transformer 201 including a primary winding 200 and a secondary winding 202. In this embodiment, the secondary winding 202 provides power to the insulation detector power supply 100. FIG. 5A is a waveform of the voltage at the primary winding 200 of the boost transformer 201. The waveform is a square wave of about 510 Volts peak-to-peak (265 Volts maximum) centered on zero voltage. In one example, the winding ratio of the boost transformer 201 is 4:1, so the waveform across the secondary winding 202 of the boost transformer 201 is a square wave of about 125 Volts peak-to-peak (62.5 Volts maximum) centered on zero voltage as shown in FIG. 5B.

Referring to FIG. 4B, the insulation detector power supply 100 includes a voltage doubler circuit 204, a voltage regulator 206, a short protector 108, insulation detector isolation 106, supply output 29, and voltage range detector 112. In this example, the insulation detector power supply 100 also includes a reverse current prevention diode 208 and an open circuit load 210. The insulation detector power supply 100 receives power from the secondary winding 202 of the boost converter/PFC 16 and provides power at a regulated voltage to the heating element 32 at the supply output 29. The insulation detector power supply 100 generates the lamp standby signal 114, which can be inhibited by a lamp off signal 234.

In this exemplary embodiment, the voltage doubler circuit 204 is shown as including the secondary winding 202 of the boost converter/PFC 16. The voltage doubler circuit 204 doubles the voltage received from the secondary winding 202, i.e., the 62.5 Volts maximum as shown in FIG. 5B is doubled to 125 Volts DC of the multiplied power 205 as shown in FIG. 5C. The waveform as shown in FIG. 5C omits the voltage ripple and variation that would be expected in the unregulated multiplied power 205 for clarity of illustration. Those skilled in the art will appreciate that the voltage doubler circuit 204 can be replaced by a voltage tripler circuit, a voltage quadra puller, a voltage pent puller, or the like, as desired for a particular application.

Referring to FIG. 4B, the voltage regulator 206 is operably connected to the voltage doubler circuit 204 and the short protector 108. The voltage regulator 206, such as the exemplary Zener voltage regulator shown, regulates the multiplied power 205 received from the voltage doubler circuit 204 to generate regulated power 207. In one example, the voltage regulator 206 converts the unregulated 125 Volts DC from the voltage doubler circuit 204 to regulated 120 Volt DC power, which is provided to the heating element 32 at the supply output 29. The short protector 108 monitors the voltage across the heating element 32 at the supply output 29. When the supply output 29 is shorted, the short protector 108 provides a shorted signal 240 to the voltage regulator 206, which shuts down the regulated power 207.

The reverse current prevention diode 208 and the open circuit load 210 protect the circuitry of the insulation detector power supply 100. The reverse current prevention diode 208 prevents reverse flow of current from the heating element 32 at the supply output 29 into the insulation detector power supply 100. The open circuit load 210 provides a load across the supply output 29 when the heating element 32 is not installed. In one embodiment, the resistance of the open circuit load 210 is selected to be small enough so that the voltage range detector 112 still detects the absence of the heating element 32 when the heating element 32 is not installed.

The insulation detector isolation 106 isolates the insulation detector power supply 100 from the rest of the electronic ballast 10. The insulation detector isolation 106 prevents voltage at the supply output 29 for the heating element 32 from passing into the rest of the electronic ballast 10 or voltage from the rest of the electronic ballast 10 from passing into the insulation detector power supply 100. In one embodiment, the insulation detector isolation 106 is a resistance isolating the supply output 29 and the heating element 32.

The voltage range detector 112 generates a lamp standby signal 114 to shut down lamp power to the lamp when an off-normal condition is detected. The voltage range detector 112 monitors heating element current 220 through the heating element 32 as heating element voltage signal 222, which is provided to upper limit comparator 224 and lower limit comparator 226. The upper limit comparator 224 and lower limit comparator 226 monitor the heating element voltage signal 222 to assure that the heating element current 220 is within the desired range. In one embodiment, the range for the heating element voltage signal 222 is about 7 to 8 VDC. The upper limit comparator 224 compares the heating element voltage signal 222 to an upper reference voltage signal 230 generated by reference voltage circuit 228. The lower limit comparator 226 compares the heating element voltage signal 222 to a lower reference voltage signal 232 generated by the reference voltage circuit 228. When the heating element voltage signal 222 exceeds the upper reference voltage signal 230, the upper limit comparator 224 generates the lamp standby signal 114. When the heating element voltage signal 222 falls below the lower reference voltage signal 232, the lower limit comparator 226 generates the lamp standby signal 114. The lamp standby signal 114 can be provided to any place in the electronic ballast that is able to shut down the lamp power to the lamp. In one example, the lamp standby signal 114 is provided to the microprocessor in the step-down converter/inverter and the microprocessor shuts down the step-down converter/inverter providing lamp power to the lamp. In this example, the voltage range detector 112 is responsive to a lamp off signal 234, which inhibits the lamp standby signal 114. Inhibiting the lamp standby signal 114 with the lamp off signal 234 allows lamp start up without the lamp standby signal 114 interfering.

The short protector 108, insulation detector isolation 106, and the voltage range detector 112 act as protective circuits for the insulation detector power supply 100. The short protector 108 acts as short protector when there is a short across the supply output 29 for the heating element 32. The insulation detector isolation 106 isolates the insulation detector power supply 100 from the rest of the electronic ballast 10. The voltage range detector 112 acts as short protector, an insulation detector sensor, and a miswiring detector. When the supply output 29 is shorted, the voltage range detector 112 will detect that the heating element current 220 is too high as indicated by the heating element voltage signal 222. When the supply output 29 is open, such as when no insulation detector is installed, the voltage range detector 112 will detect that the heating element current 220 is too low as indicated by the heating element voltage signal 222. Miswiring can cause a short, an open, or a partial short or partial open. When the voltage range detector 112 detects the heating element current 220 as indicated by the heating element voltage signal 222 as being outside the desired range, the voltage range detector 112 generates the lamp standby signal 114 to shut down the lamp power to the lamp.

While the embodiments of the invention disclosed herein are presently considered to be preferred, various changes and modifications can be made without departing from the scope of the invention. Those skilled in the art will appreciate that the embodiments described for FIGS. 1-5C are exemplary and that alternative circuits can be used as desired for particular applications. The scope of the invention is indicated in the appended claims, and all changes that come within the meaning and range of equivalents are intended to be embraced therein.

The invention claimed is:

1. A power supply for an insulation detector having a heating element and a temperature sensitive switch thermally coupled to the heating element, the power supply comprising:
 a power circuit 120 operable to provide heating element power 102 to the heating element 32;
 a short protector 108 operably connected to the power circuit 120 to monitor current flow through the heating element 32; and
 an insulation detector sensor 110 operably connected to the power circuit 120 to monitor presence of the heating element 32.

2. The power supply of claim 1 wherein the power circuit 120 is a voltage multiplier circuit.

3. The power supply of claim 2 wherein the voltage multiplier circuit is selected from the group consisting of a voltage doubler circuit, a voltage tripler circuit, a voltage quadra puller, and a voltage pent puller.

4. The power supply of claim 1 wherein the power circuit 120 is a switched mode power supply (SMPS).

5. The power supply of claim 4 wherein the switched mode power supply (SMPS) is selected from the group consisting of a buck converter, boost converter, buck-boost converter, flyback converter, forward converter, Ćuk converter, and a SEPIC converter.

6. The power supply of claim 4 wherein the switched mode power supply (SMPS) has a pulse width modulator (PWM) circuit 140 and the short protector 108 is the pulse width modulator (PWM) circuit 140.

7. The power supply of claim 4 wherein the switched mode power supply (SMPS) has a pulse width modulator (PWM) circuit 140 and the insulation detector sensor 110 is the pulse width modulator (PWM) circuit 140.

8. The power supply of claim 1 wherein the short protector 108 is a voltage range detector 112.

9. The power supply of claim 8 wherein the voltage range detector 112 generates a lamp standby signal 114 when the current flow is outside a predetermined range.

10. The power supply of claim 9 wherein the voltage range detector 112 is responsive to a lamp off signal 234 to inhibit the lamp standby signal 114.

11. The power supply of claim 1 wherein the insulation detector sensor 110 is a voltage range detector 112.

12. The power supply of claim 11 wherein the voltage range detector 112 generates a lamp standby signal 114 when the heating element 32 is not present.

13. The power supply of claim 12 wherein the voltage range detector 112 is responsive to a lamp off signal 234 to inhibit the lamp standby signal 114.

14. The power supply of claim 1 further comprising an insulation detector isolation 106 operably connected to the power circuit 120 to isolate the heating element 32.

15. A power supply system for an insulation detector having a heating element and a temperature sensitive switch thermally coupled to the heating element, the power supply system comprising:
 means for providing heating element power to the heating element;
 means for protecting the power providing means from shorts operably connected to the power providing means; and
 means for detecting insulation detector presence operably connected to the power providing means.

16. The system of claim 15 further comprising means for isolating the heating element operably connected to the power providing means.

17. The system of claim 15 further comprising means for detecting when heating element current is outside a predetermined range operably connected to the power providing means.

18. An electronic ballast for an insulation detector having a heating element and a temperature sensitive switch thermally coupled to the heating element, the electronic ballast comprising:
- an electronic ballast power supply 13;
- a power circuit 120 receiving supply power 104 from the electronic ballast power supply 13 and operable to provide heating element power 102 to the heating element 32; and
- a short protector 108 operably connected to the power circuit 120 to monitor current flow through the heating element 32; and
- an insulation detector sensor 110 operably connected to the power circuit 120 to monitor presence of the heating element 32.

19. The electronic ballast of claim 18 wherein the power circuit 120 is a voltage multiplier circuit.

20. The electronic ballast of claim 19 wherein the voltage multiplier circuit is selected from the group consisting of a voltage doubler circuit, a voltage tripler circuit, a voltage quadra puller, and a voltage pent puller.

21. The electronic ballast of claim 18 wherein the power circuit 120 is a switched mode power supply (SMPS).

22. The electronic ballast of claim 21 wherein the switched mode power supply (SMPS) is selected from the group consisting of a buck converter, boost converter, buck-boost converter, flyback converter, forward converter, Ćuk converter, and a SEPIC converter.

23. The electronic ballast of claim 21 wherein the switched mode power supply (SMPS) has a pulse width modulator (PWM) circuit 140 and the short protector 108 is the pulse width modulator (PWM) circuit 140.

24. The electronic ballast of claim 21 wherein the switched mode power supply (SMPS) has a pulse width modulator (PWM) circuit 140 and the insulation detector sensor 110 is the pulse width modulator (PWM) circuit 140.

25. The electronic ballast of claim 18 wherein the short protector 108 is a voltage range detector 112.

26. The electronic ballast of claim 25 wherein the voltage range detector 112 generates a lamp standby signal 114 when the current flow is outside a predetermined range.

27. The electronic ballast of claim 26 wherein the voltage range detector 112 is responsive to a lamp off signal 234 to inhibit the lamp standby signal 114.

28. The electronic ballast of claim 18 wherein the insulation detector sensor 110 is a voltage range detector 112.

29. The electronic ballast of claim 28 wherein the voltage range detector 112 generates a lamp standby signal 114 when the heating element 32 is not present.

30. The electronic ballast of claim 29 wherein the voltage range detector 112 is responsive to a lamp off signal 234 to inhibit the lamp standby signal 114.

31. The electronic ballast of claim 18 further comprising an insulation detector isolation 106 operably connected to the power circuit 120 to isolate the heating element 32.

32. An electronic ballast with an insulation detector having a heating element and a temperature sensitive switch thermally coupled to the heating element, the electronic ballast comprising:
- an electronic ballast power supply 13 having boost transformer 201, the boost transformer 201 having a primary winding 200 and a secondary winding 202; and
- a voltage multiplier circuit including the secondary winding 202 and being operable to provide heating element power 102 to the heating element 32.

33. The electronic ballast of claim 32 wherein the voltage multiplier circuit is a voltage doubler circuit 204.

34. The electronic ballast of claim 32 further comprising a voltage regulator 206 operably coupled to the voltage multiplier circuit.

35. The electronic ballast of claim 32 further comprising a short protector 108 operably coupled to the voltage multiplier circuit.

36. The electronic ballast of claim 32 wherein the voltage multiplier circuit has a supply output 29 operable to receive the heating element 32, further comprising an insulation detector isolation 106 operably connected to the supply output 29.

37. The electronic ballast of claim 32 further comprising a voltage range detector 112 operably coupled to the voltage multiplier circuit to monitor current flow through the heating element 32.

38. The electronic ballast of claim 37 wherein the voltage range detector 112 generates a lamp standby signal 114 when the current flow is outside a predetermined range.

39. The electronic ballast of claim 38 wherein the voltage range detector 112 is responsive to a lamp off signal 234 to inhibit the lamp standby signal 114.

* * * * *